United States Patent
Van Rooij et al.

(10) Patent No.: US 8,495,667 B2
(45) Date of Patent: Jul. 23, 2013

(54) OPTICAL DISC DEVICE HAVING A BLOCKING MEANS FOR ITS OPTICAL PICKUP UNIT

(75) Inventors: Johannes Antonius Van Rooij, Eindhoven (NL); Myriam Sabine Josee Splets, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1139 days.

(21) Appl. No.: 11/917,219

(22) PCT Filed: Jun. 15, 2006

(86) PCT No.: PCT/IB2006/051925
§ 371 (c)(1),
(2), (4) Date: Dec. 12, 2007

(87) PCT Pub. No.: WO2006/134571
PCT Pub. Date: Dec. 21, 2006

(65) Prior Publication Data
US 2008/0209459 A1 Aug. 28, 2008

(30) Foreign Application Priority Data
Jun. 17, 2005 (EP) .................................... 05105356

(51) Int. Cl.
*G11B 7/0037* (2006.01)
*G11B 7/085* (2006.01)
*G11B 33/14* (2006.01)

(52) U.S. Cl.
USPC .............................. 720/675; 720/673; 720/677

(58) Field of Classification Search
USPC .......................... 720/673, 677, 675, 674, 676
See application file for complete search history.

(56) References Cited

U.S. PATENT DOCUMENTS

| | | | |
|---|---|---|---|
| 4,890,276 A | 12/1989 | Ono et al. | |
| 4,914,647 A * | 4/1990 | Ono et al. | 720/673 |
| 5,023,862 A | 6/1991 | Kim | |
| 5,754,022 A | 5/1998 | Uehara et al. | |
| 6,046,974 A | 4/2000 | Uehara | |
| 7,203,950 B2 * | 4/2007 | Lee | 720/675 |
| 7,544,004 B2 * | 6/2009 | Kawai et al. | 396/529 |
| 2002/0039337 A1 | 4/2002 | Seto | |
| 2004/0194120 A1 * | 9/2004 | Su | 720/676 |
| 2005/0022218 A1 | 1/2005 | Hoshino | |

FOREIGN PATENT DOCUMENTS

| | | |
|---|---|---|
| EP | 0676518 A2 | 10/1995 |
| JP | 63053757 | 3/1988 |

(Continued)

OTHER PUBLICATIONS

ISR/Written Opinion of the International Searching Aurhority PCT/IB20060511925.

*Primary Examiner* — Julie Anne Watko (57) ABSTRACT

An optical disc recording and/or reproducing device comprising a drive for rotating an optical disc around an axis of rotation, a movable optical pickup unit (5) and a frame (1) having at least one guiding rod (4) for guiding a displacement of the optical pickup unit (5) in a substantially radial direction with respect to the axis of rotation. The guiding rod (4) is provided with a protrusion (17) for restricting the movement of the optical pickup unit (5) when the guiding rod (4) is in a is in a predetermined rotational position. The guiding rod (4) is rotationally drivable by an electric drive motor in order to move the protrusion (17) for either releasing or blocking the optical pickup unit (5).

7 Claims, 4 Drawing Sheets

FOREIGN PATENT DOCUMENTS

| | | |
|---|---|---|
| JP | 63083982 A | 4/1988 |
| JP | 04109433 A * | 4/1992 |
| JP | 6342569 A | 12/1994 |
| JP | 09198685 | 7/1997 |
| JP | 2003022553 A * | 1/2003 |
| JP | 2003099966 | 4/2003 |

* cited by examiner

OPTICAL DISC DEVICE HAVING A BLOCKING MEANS FOR ITS OPTICAL PICKUP UNIT

The invention relates to an optical disc recording and/or reproducing device comprising a drive for rotating an optical disc around an axis of rotation, a movable optical pickup unit and a frame having at least one guiding rod for guiding a displacement of the optical pickup unit in a substantially radial direction with respect to the axis of rotation, wherein the guiding rod is provided with a protrusion for restricting the movement of the optical pickup unit when the guiding rod is in a predetermined rotational position. Said radial direction is a direction perpendicularly crossing the axis of rotation of the optical disc when the device is in operation.

An example of such an optical disc device is disclosed in US-A-2004/0194120. The device described in this publication comprises a main guiding rod and a sub-guiding rod, both positioned parallel to the radial direction with respect to the rotating optical disc. The protrusion is present on the sub-guiding rod and is movable between a first position and a second position by rotating the sub-guiding rod. When the protrusion is in the first position, it blocks the optical pickup unit so that this unit cannot move along the guiding rods. When the protrusion is in the second position, the optical pickup unit is released and can be displaced along the two guiding rods in order to move over the surface of the rotating optical disc.

The optical pickup unit comprises an objective lens for directing laser radiation, emitted by a laser diode, in a converging beam to the surface of the rotating optical disc in order to record information on the optical disc. When information is reproduced, a laser beam is reflected by the optical disc and passes through the objective lens to arrive at a photodetector arranged within the optical pickup unit. Previously recorded information can thereby be reproduced.

The optical pickup unit including the objective lens is a vulnerable part of the optical disc device. When the optical disc device is shipped, it will be subjected to shocks and/or vibrations, resulting in uncontrolled movements of the optical pickup unit, so that it may be damaged. In order to avoid such damage, the movement of the optical pickup unit can be blocked by placing the guiding rod in said predetermined rotational position, while the protrusion is brought into said first position, so that the movement of the optical pickup unit is restricted or blocked.

In the known optical disc device, one end of the rotatable guiding rod extends outside the optical disc device, and said guiding rod can be engaged by a screwdriver or another special tool in order to rotate it through 90° from its first position to its second position, whereby the optical pickup unit is released, i.e. being freely movable along the guiding rods. Such a rotation of the guiding rod can be realized before the optical disc device is mounted in a computer or another apparatus, so that the manufacturer of this apparatus can be sure that the optical pickup unit is not damaged before the optical disc device is incorporated in the apparatus. However, after the optical pickup unit has been mounted in the apparatus, this apparatus has to be transported to its end user, and the optical disc device may again be subjected to shocks and/or vibrations. Damage due to such further shipment can be avoided by keeping the optical pickup unit blocked up to the moment when the apparatus has arrived at its final destination where it will be used by the end user. In order to rotate the guiding rod after the apparatus has arrived at its final destination, the end of the guiding rod must still be accessible when the optical disc device is mounted in the computer or another apparatus. Furthermore, the operation of rotating the guiding rod must be simple, so that the end user of the apparatus can perform this operation without complicated instructions or special tools. For these reasons, the optical pickup unit is not blocked during shipment to the end user, so that the optical pickup unit may still be damaged.

However, releasing (unlocking) the optical pickup unit when the optical disc device is mounted in the computer or another apparatus by its manufacturer is desired in order to test the apparatus after manufacture. In this case, it may be required to test also the optical disc device, in which test the optical pickup unit must be freely movable along the guiding rod. The manufacturer can of course rotate the guiding rod again to said predetermined rotational position after the tests, thus restricting the movement of the optical pickup unit, but this is an additional and undesirable operation.

It is an object of the invention to provide an optical disc recording and/or reproducing device comprising a movable optical pickup unit, wherein the optical disc device and the apparatus in which the optical disc device is incorporated can be transported to the end user without the risk of damaging the optical pickup unit of the optical disc device.

To achieve this object, the guiding rod is rotationally drivable by an electric drive motor in order to move the protrusion for either releasing or blocking the optical pickup unit. The device according to the invention is defined in claim 1. The electric drive motor can be switched on and off by the operator of the device, but the optical disc device and/or the computer or the apparatus in which the optical disc device is incorporated is preferably programmed in a manner in which the electric drive motor rotates the guiding rod into or away from said predetermined rotational position, so that said protrusion will either block or release the optical pickup unit at any predetermined moment.

The electric drive motor preferably rotates the guiding rod after the optical disc device has been started up in order to release the optical pickup unit, and the electric drive motor rotates the guiding rod into said predetermined rotational position after the optical pickup unit has moved and returned to its original position. The optical pickup unit is released when the optical disc device is in use, and the unit is always blocked when the device is not in use. Consequently, the optical pickup unit cannot be damaged during shipment to the manufacturer of the apparatus in which the optical disc device is incorporated, and also during further shipment to the end user of the apparatus, while the functioning of the optical disc device can be tested by said manufacturer. Moreover, the optical pickup unit cannot be damaged when the optical disc device, or the apparatus in which the device is incorporated, is subjected to vibrations or shocks at any time after it has been received by the end user.

In a preferred embodiment, the optical disc device and/or the apparatus in which the device is incorporated is programmed in such a manner that there is first a temporary stage in which the electric drive motor rotates the guiding rod into said predetermined position, and that said stage terminates after a certain moment. The electric drive motor preferably rotates the guiding rod only a certain number of times into said predetermined rotational position, so that the optical disc device can be tested by its manufacturer, and can also be tested after the manufacturer of this apparatus has incorporated the device in a computer or other apparatus, while the apparatus can be shipped to the end user without the risk of damaging the optical pickup unit. Said number of times may be ten or less, preferably less than five, in any case enough times to test the optical disc device once or more before the device arrives at its final destination where it will be used by the end user. The optical pickup unit may also be blocked a number of times after arrival at said final destination, although it requires some additional time when starting up the optical disc device. Therefore, the blocking position of the protrusion is preferably not used after arrival at the final destination, or should only operate a limited number of times after arrival.

The guiding rod is preferably rotatable by means of a worm gearing, wherein a worm is attached to the frame and an engaging worm wheel is attached to the guiding rod, and wherein the worm is rotationally driven by the electric drive motor. Such a simple drive mechanism makes it possible to put the guiding rod in any desired rotational position, so that the rotation of the guiding rod can also be used for other purposes, as will be elucidated hereinafter.

In a preferred embodiment, said electric drive motor can also move other parts of the device, so that the protection of the optical pickup unit during shipment as described above does not require an additional electric drive motor. It was found that rotation of the guiding rod by means of an electric drive motor may also serve other purposes, as is the case in the following embodiment of the invention.

In a preferred embodiment, the guiding rod has two eccentric portions each being supported in the frame by means of a bearing, so that the guiding portion of the guiding rod can be displaced perpendicularly to its longitudinal axis by rotating the guiding rod. The bearings are preferably located at or near the ends of the guiding rod. The displacement of the guiding rod will tilt the optical pickup unit around an axis which is parallel to the radial direction with respect to the rotating optical disc, so that the tilt angle of the optical pickup unit with respect to the surface of the rotating optical disc can be adjusted or varied. Such an adjustment or variation of the tilt angle is an advantage, in particular when different types of optical discs are used in the optical disc device.

Information can be recorded or reproduced by means of different types of optical discs, such as a CD (Compact Disc), or a DVD (Digital Versatile Disc), or a BD (Blu-Ray Disc). Although all of these recording/reproducing systems make use of different techniques, all of them can be applied in the same recording and/or reproducing device as described above, provided that the optical pickup unit comprises the components required for each of these techniques.

When different types of optical discs are used, small adaptations of the tilt angle of the optical pickup unit, i.e. the angle between the surface of the optical disc and the objective lens of the pickup unit, in the tangential plane (i.e. rotation around a radially directed axis) can improve the functioning of the device. Such adaptations of the tilt angle are small, for example, less than $3.10^{-3}$ radians. The optimal and most reliable functioning of the device for any type of optical disc is achieved with a different tilt angle of the objective lens relative to the surface of the optical disc, and the optimal tilt angle for any optical disc system can be easily determined by experimentation. Such different tilt angles can be adjusted by rotating the guiding rod with eccentric portions as described above.

According to the invention, both features, i.e. the feature of blocking the movement of the optical pickup unit during shipment of the device and the feature of adjusting the tilt angle of the objective lens, require the same additional components in order to rotate the guiding rod, and such a combination of features is therefore a substantial advantage.

The invention further relates to an apparatus, in particular a computer, comprising an optical disc device as described above, wherein the optical disc device and/or the apparatus in which the device is incorporated is programmed in such a manner that there is first a temporary stage in which the electric drive motor rotates the guiding rod into said predetermined position, and that said stage terminates after a certain moment.

The invention also relates to an apparatus, in particular a computer, comprising an optical disc device as described above, wherein the optical disc device and/or the apparatus in which the device is incorporated comprise control means for controlling said motor, the control means being programmed in such a manner that the operator of the apparatus can bring the guiding rod into said predetermined position before switching off the apparatus. The operator can thus park the optical pickup unit in its blocked position any time the apparatus is transported or otherwise subjected to vibrations or shocks.

The invention also relates to a method of recording and/or reproducing data by means of an optical disc device comprising a drive for rotating an optical disc around an axis of rotation, a movable optical pickup unit and a frame having at least one guiding rod for guiding a displacement of an optical pickup unit in a substantially radial direction with respect to the axis of rotation, wherein the guiding rod is provided with a protrusion for restricting the movement of the optical pickup unit when the guiding rod is in a predetermined rotational position, and wherein an electric drive motor rotates the guiding rod in order to move the protrusion for either releasing or blocking the optical pickup unit.

The invention will now be further elucidated by means of a description of two examples of an optical disc recording and/or reproducing device comprising a movable optical pickup unit and a frame having at least one guiding rod for guiding a displacement of the optical pickup unit in a substantially radial direction with respect to the rotating optical disc. The first example comprises means for rotating the guiding rod, wherein the guiding rod is displaced in order to adjust the tilt angle of the optical pickup unit, and, according to the invention, the second example is provided with means for blocking the optical pickup unit during shipment. Reference is made to the drawing comprising Figures which are only schematic representations of a part of the optical disc recording/reproducing device, in which.

Figure 1:
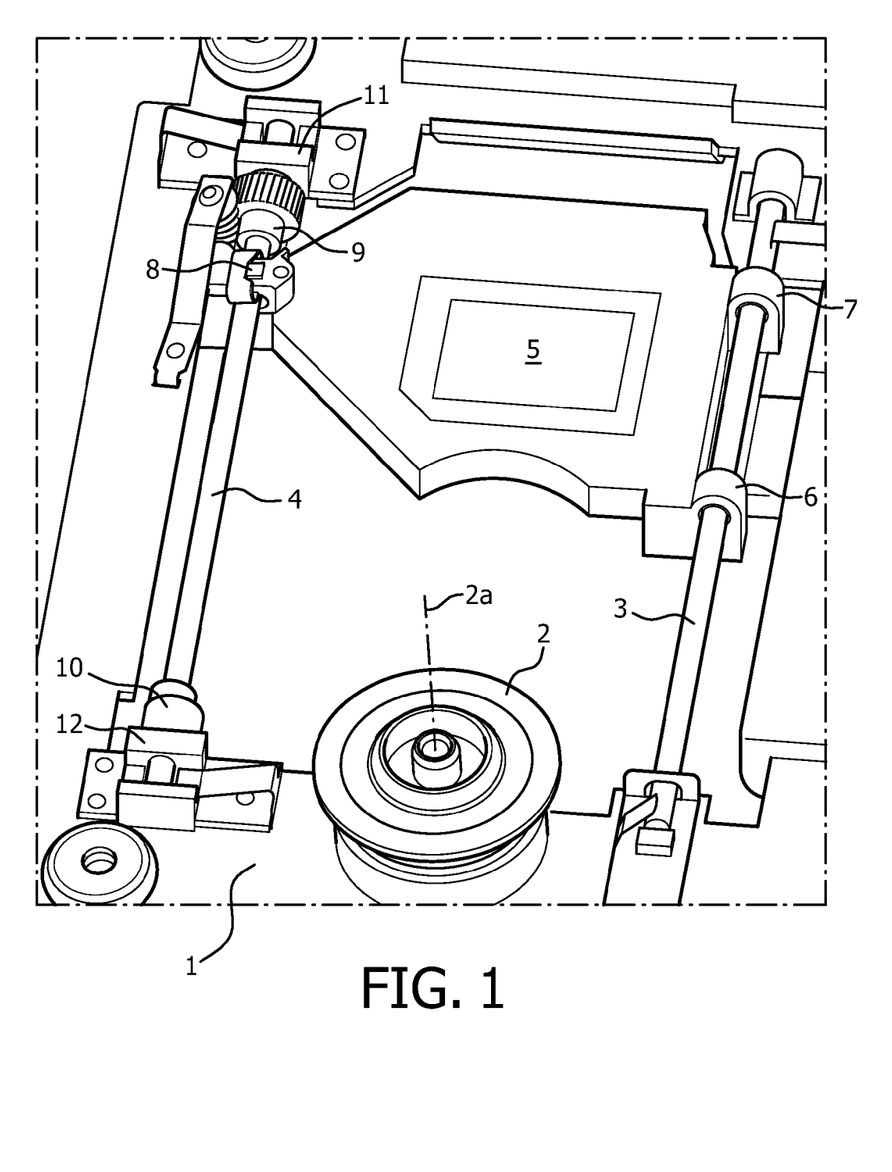
FIG. 1 shows a first embodiment not having a blocking/release feature according to the invention.

FIG. 1 shows a frame 1 which is provided with a drive, in this embodiment in the form of a turntable 2, to which an optical disc (not shown) can be attached or secured. The turntable 2 is rotatable around an axis of rotation 2a. Furthermore, the frame comprises a first guiding rod 3 and a second guiding rod 4, both having a cylindrical outer surface. The first guiding rod 3 is fixed at both ends in frame 1. The optical pickup unit 5 engages the first guiding rod 3 by means of two bearings 6, 7 at a distance from each other, enabling the optical pickup unit 5 to slide along first guiding rod 3, i.e. in the direction of the axis of first guiding rod 3. The central part of optical pickup unit 5 thus moves in the radial direction with respect to turntable 2. An objective lens (not shown in FIG. 1) emitting a converging laser beam is present at said central part, which laser beam can hit the rotating optical disc (not shown) that is engaged by the turntable 2. By moving the optical pickup unit 5 in the radial direction, the laser beam can reach a predetermined region of the surface of the rotating optical disc, while the laser beam is directed substantially perpendicularly to said surface.

The second guiding rod 4 is engaged by the optical pickup unit 5 by means of one bearing 8, so that the optical pickup unit 5 can only make one motion: a sliding motion in which the objective lens of the optical pickup unit 5 is moved in a straight path in the radial direction parallel to the surface of the rotating optical disc. The means for driving the optical pickup unit 5 along its radially directed straight path are not shown in the Figures. Such means may be a worm gear system or any other drive mechanism which can provide a linear motion.

In order to change the tilt angle of the optical pickup unit 5 in a plane perpendicular to the radial direction, the optical pickup unit 5 can rotate around the first guiding rod 3. Such a rotation is achieved by displacing the second guiding rod 4 in a direction perpendicular to its axis. Therefore, both end portions 9, 10 of the second guiding rod 4 are positioned eccentrically with respect to the central part (guiding portion) of the second guiding rod 4. The eccentric end portions 9, 10 are supported in the frame 1 by means of two coaxial bearings 11, 12, so that the axis of the central part of the second guiding rod 4 is positioned at a distance from the axis of the two bearings 11, 12. Rotation of the second guiding rod 4 around the axis of the two bearings 11, 12 results in a displacement of the second guiding rod 4, i.e. the central part of guiding rod 4, in a direction perpendicular to its longitudinal axis, whereby said tilt angle of the optical pickup unit 5 changes.

When the second guiding rod 4 rotates, the displacement of this second guiding rod 4 is not a motion in a straight path, but a motion in a circular path around the axis of the coaxial bearings 11, 12. The bearing 8 must therefore allow a relative motion of the longitudinal axis of the second guiding rod 4 relative to the optical pickup unit 5.

Figure 2:
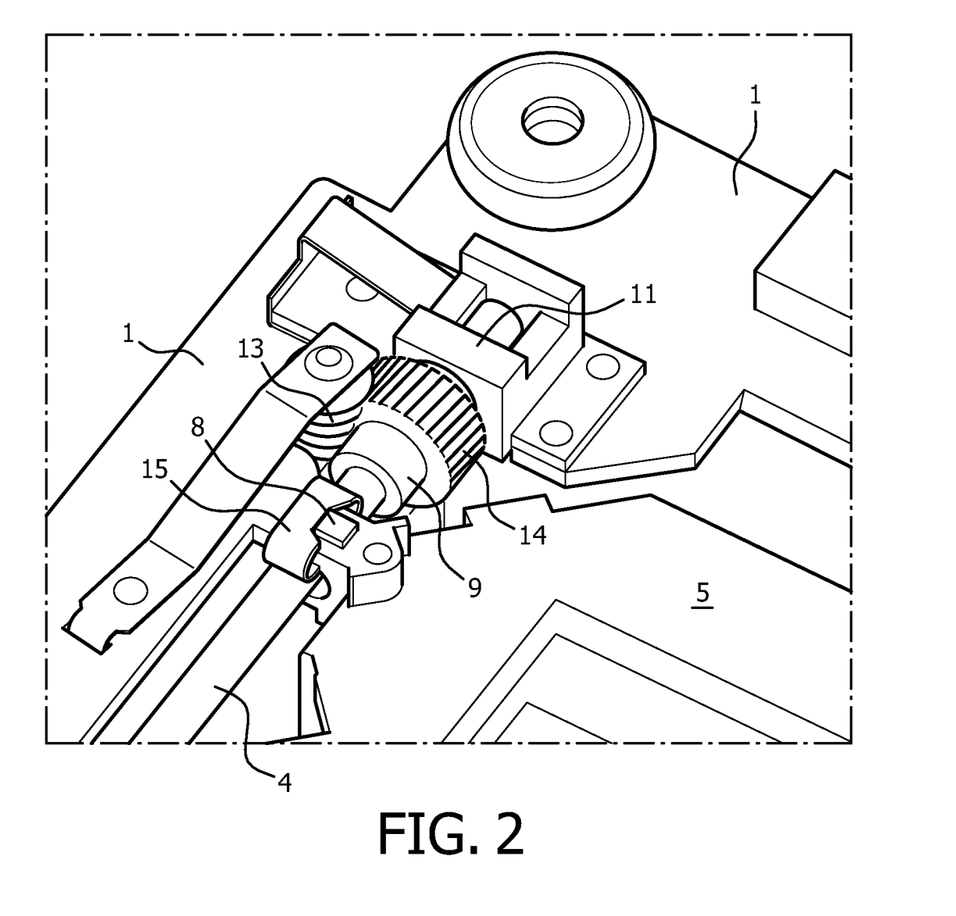
FIG. 2 shows a detail of the first embodiment.

FIG. 2 shows the means for displacing the second guiding rod 4 in more detail. Frame 1 is provided with a worm 13 which engages worm wheel 14 on the eccentric portion 9 of second guiding rod 4. Worm 13 is driven by an electric motor (not shown), and a relatively fast rotation of worm 13 results in a much slower rotation of worm wheel 14, and consequently a slow displacement of the longitudinal axis of second guiding rod 4. The bearing 8, which is attached to the optical pickup unit 5, engages the second guiding rod 4 with a fixed flat engaging surface at the rear side (in FIGS. 1 and 2) of the cylindrical surface of second guiding rod 4, and with a spring member 15 at the front side of said cylindrical surface, which spring member 15 pushes the second guiding rod 4 against said flat engaging surface. Consequently, the second guiding rod 4 can move in a direction parallel to said flat engaging surface relative to the optical pickup unit 5.

Figure 3:
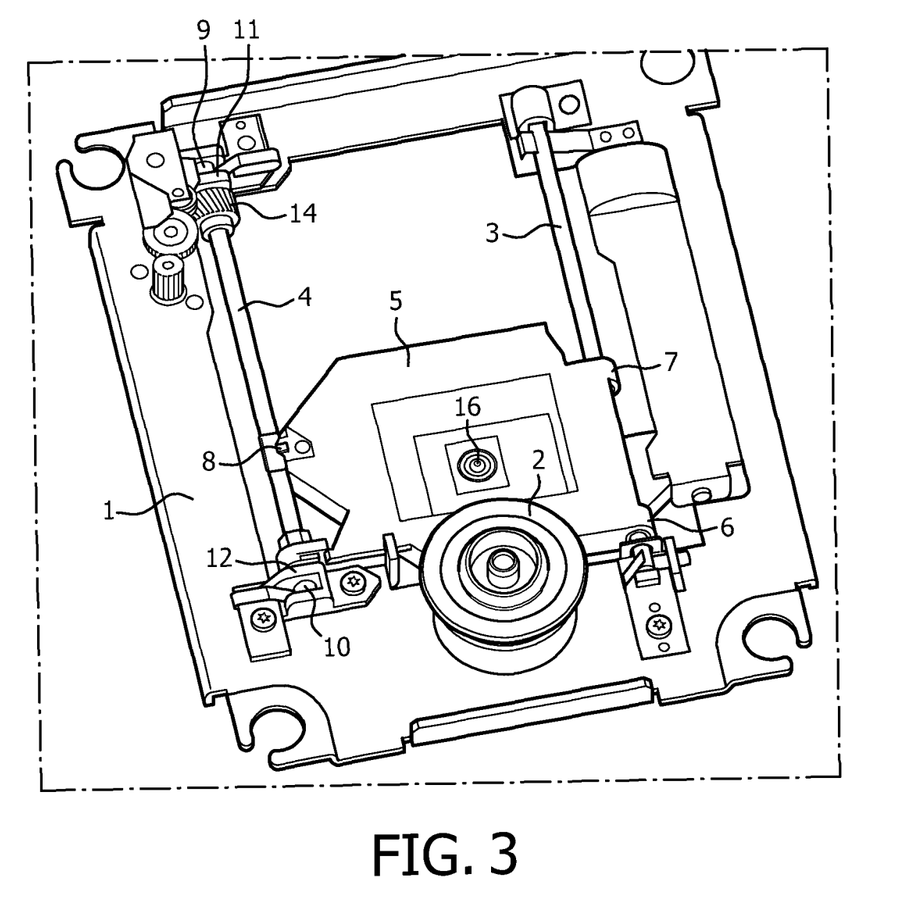
FIG. 3 shows a second embodiment comprising the blocking/release feature according to the invention.
Figure 4:
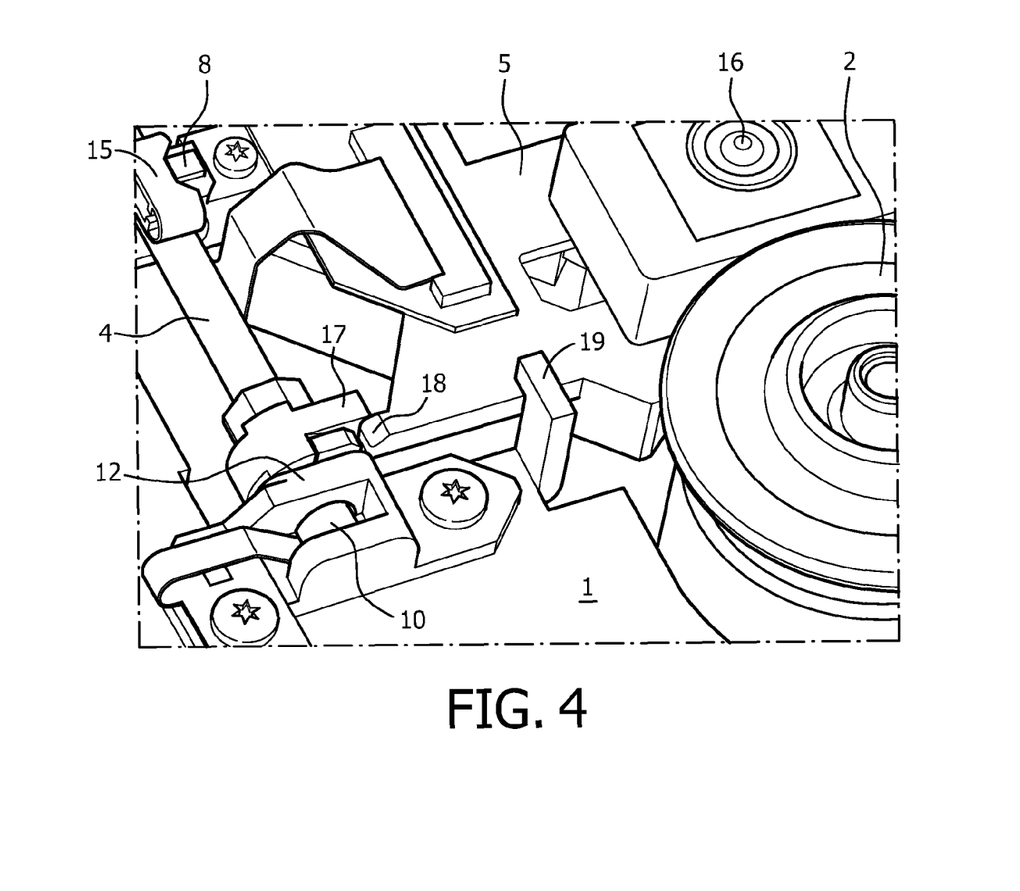
FIG. 4 shows a detail of the second embodiment.

The second embodiment of the optical disc device is shown in FIGS. 3 and 4, in which parts similar to those in the first embodiment are denoted by the same reference numerals. In FIGS. 1 and 2, the optical pickup unit 5 of the first embodiment is shown in a position away from the turntable 2, and in FIGS. 3 and 4 the optical pickup unit 5 is represented in a position close to the turntable 2. Furthermore, the objective lens 16 is represented in FIGS. 3 and 4.

The second guiding rod 4 of the second embodiment, as shown in FIGS. 3 and 4, is rotatable, and its coaxial eccentric portions 9, 10 are supported in bearings 11, 12 which are fixed on the frame 1. By rotating the second guiding rod 4 in its bearings 11, 12, the central part of the second guiding rod 4 will be displaced perpendicularly to its longitudinal axis, so that the objective lens 16 will tilt a little when the second guiding rod 4 rotates, as described with reference to FIG. 1.

Furthermore, the second guiding rod 4 is provided with a protrusion 17 which is displaced in a circular path when the second guiding rod 4 rotates. In a predetermined rotational position of the second guiding rod 4, which position is shown in FIGS. 3 and 4, the protrusion 17 blocks the movement of the optical pickup unit 5. The portion 18 of the optical pickup unit 5 is caught behind the protrusion 17, so that the optical pickup unit 5 cannot move away from the turntable 2. A stop 19 prevents the optical pickup unit from touching the turntable 2. The optical pickup unit 5 can be released by rotating the second guiding rod 4, whereby protrusion 17 is displaced away from the portion 18 of the optical pickup unit 5. Then the optical pickup unit 5 can be moved along the two guiding rods 3, 4 in a direction away from the turntable 2.

In order to tilt the optical pickup unit 5 with the objective lens 16, the second guiding rod 4 can be rotated through an angle of 180°, at which the central part of the second guiding rod 4 moves between a location closer to the rotating disc and a position further away from the rotating disc. The control means (not shown) for controlling the rotation of second guiding rod 4 can thus fix the guiding rod 4 in any position within said angle of 180° so as to adjust the desired tilt angle of the objective lens 16. In order to bring the protrusion 17 into the blocking position, as is shown in FIGS. 3 and 4, the second guiding rod 4 has to be rotated beyond said rotation of 180°, for which an additional rotation of about 15° is sufficient.

The invention can be easily applied in the described first embodiment of the optical disc device when the second guiding rod 4 can rotate a little more than is required for adjusting the tilt angle, so that the second guiding rod 4 can be brought into said predetermined rotational position.

The embodiments of the optical disc recording and/or reproducing device as described above are only examples; other embodiments are alternatively possible.

LIST OF REFERENCE NUMERALS 1 frame
2 turntable (drive)
2a axis of rotation
3 first guiding rod
4 second guiding rod
5 optical pickup unit
6 bearing engaging rod 3
7 bearing engaging rod 3
8 bearing engaging rod 4
9 end portion of second guiding rod 4
10 end portion of second guiding rod 4
11 bearing of second guiding rod 4
12 bearing of second guiding rod 4
13 worm
14 worm wheel
15 spring member
16 objective lens
17 protrusion of guiding rod 4
18 portion of optical pickup unit 5
19 stop

The invention claimed is:
1. An optical disc recording and/or reproducing device comprising:
   a drive for rotating an optical disc around an axis of rotation,
   a movable optical pickup unit and
   a frame having at least one guiding rod for guiding a displacement of said optical pickup unit in a substantially radial direction with respect to the axis of rotation, said guiding rod comprising a first guiding rod in parallel with a second guiding rod, both the first guiding rod and the second guiding rods being engaged by the opti- cal pickup unit for guiding the displacement of the pickup unit, wherein the second guiding rod is provided with a protrusion, characterized in that the second guiding rod has two eccentric portions each being supported in the frame by means of a bearing, so that the guiding portion of the second guiding rod can be displaced perpendicularly to its longitudinal axis by rotating the second guiding rod, and the protrusion retaining the optical pickup unit in a locking position when the second guiding rod is in a predetermined rotational position, and wherein the second guiding rod is rotationally drivable by an electric drive motor through a worm gear, comprising a worm attached to the frame and an engaging wheel attached to the second guiding rod, in order to move the protrusion for either releasing or blocking the optical pickup unit, whereby the electric drive motor rotates the second guiding rod after the device has been started up in order to release the optical pickup unit, and whereby the electric drive motor rotates the second guiding rod into said predetermined rotational position after the optical pickup unit has moved and returned to said locking position.

2. A device as claimed in claim 1, wherein the electric drive motor rotates the second guiding rod into said predetermined rotational position only a predetermined number of times after the optical pickup unit has returned to said locking position.

3. An apparatus comprising:
an optical driving device comprising:
   a drive for rotating an optical disc around an axis of rotation,
   a movable optical pickup unit and
   a frame having at least one guiding rod for guiding a displacement of said optical pickup unit in a substantially radial direction with respect to the axis of rotation, said guiding rod comprising a first guiding rod in parallel with a second guiding rod, both the first guiding rod and the second guiding rods being engaged by the optical pickup unit for guiding the displacement of the pickup unit, wherein the second guiding rod is provided with a protrusion, characterized in that the second guiding rod has two eccentric portions each being supported in the frame by means of a bearing, so that the guiding portion of the second guiding rod can be displaced perpendicularly to its longitudinal axis by rotating the second guiding rod, and the protrusion retaining the optical pickup unit in a locking position when the second guiding rod is in a predetermined rotational position, and wherein the second guiding rod is rotationally drivable by an electric drive motor through a worm gear, comprising a worm attached to the frame and an engaging wheel attached to the second guiding rod, in order to move the protrusion for either releasing or blocking the optical pickup unit, whereby the electric drive motor rotates the second guiding rod after the device has been started up in order to release the optical pickup unit, and whereby the electric drive motor rotates the second guiding rod into said predetermined rotational position after the optical pickup unit has moved and returned to said locking position; and
a computer programmed to cause an electric drive motor to rotate the second guiding rod into the predetermined position for a determined period of time.

4. An apparatus comprising:
an optical driving device comprising:
   a drive for rotating an optical disc around an axis of rotation,
   a movable optical pickup unit and
   a frame having at least one guiding rod for guiding a displacement of said optical pickup unit in a substantially radial direction with respect to the axis of rotation, said guiding rod comprising a first guiding rod in parallel with a second guiding rod, both the first guiding rod and the second guiding rods being engaged by the optical pickup unit for guiding the displacement of the pickup unit, wherein the second guiding rod is provided with a protrusion, characterized in that the second guiding rod has two eccentric portions each being supported in the frame by means of a bearing, so that the guiding portion of the second guiding rod can be displaced perpendicularly to its longitudinal axis by rotating the second guiding rod, and the protrusion retaining the optical pickup unit in a locking position when the second guiding rod is in a predetermined rotational position, and wherein the second guiding rod is rotationally drivable by an electric drive motor through a worm gear in order to move the protrusion for either releasing or blocking the optical pickup unit, whereby the electric drive motor rotates the second guiding rod after the device has been started up in order to release the optical pickup unit, and whereby the electric drive motor rotates the second guiding rod into said predetermined rotational position after the optical pickup unit has moved and returned to said locking position; and
control means for controlling said motor to bring the guiding rod into said predetermined position before switching off the apparatus.

5. A method of recording and/or reproducing data by means of an optical disc device comprising:
a drive for rotating an optical disc around an axis of rotation,
a movable optical pickup unit: and
a frame having at least one guiding rod for guiding a displacement of said optical pickup unit in a substantially radial direction with respect to the axis of rotation, said guiding rod comprising a first guiding rod in parallel with a second guiding rod, both the first guiding rod and the second guiding rods being engaged by the optical pickup unit for guiding the displacement of the pickup unit, wherein the second guiding rod is provided with a protrusion, characterized in that the second guiding rod has two eccentric portions each being supported in the frame by means of a bearing, so that the guiding portion of the second guiding rod can be displaced perpendicularly to its longitudinal axis by rotating the second guiding rod, and the protrusion for keeping the optical pickup unit in a locking position when the second guiding rod is in a predetermined rotational position, and
an electric drive motor for rotating the second guiding rod to move the protrusion for either releasing or blocking the optical pickup unit whereby the electric drive motor rotates the second guiding rod after the device has been started up in order to release the optical pickup unit, and whereby the electric drive motor rotates the second guiding rod into said predetermined rotational position after the optical pickup unit has moved and returned to said locking position.

6. An optical disc recording and/or reproducing device comprising:
  an electric motor;
  a drive for rotating an optical disc around an axis of rotation,
  a movable optical pickup unit and
  a frame comprising:
    at least one guiding rod;
    a worm attached to said frame and
    an engaging worm wheel attached to the guiding rod, said guiding rod for guiding a displacement of said optical pickup unit in a substantially radial direction with respect to the axis of rotation, wherein the guiding rod is provided with a protrusion for keeping the optical pickup unit in a locking position when the guiding rod is in a predetermined rotational position, and wherein the guiding rod is rotationally drivable by the electric drive motor in order to move the protrusion for either releasing or blocking the optical pickup unit, whereby the electric drive motor rotates the guiding rod after the device has been started up in order to release the optical pickup unit, and whereby the electric drive motor rotates the guiding rod into said predetermined rotational position after the optical pickup unit has moved and returned to said locking position.

7. An optical disc comprising:
  a drive for rotating an optical disc around an axis of rotation,
  a movable optical pickup unit; and
  a frame having at least one guiding rod for guiding a displacement of said optical pickup unit in a substantially radial direction with respect to the axis of rotation of the optical disc, wherein the guiding rod comprises:
  a first guiding rod, and
  a second guiding rod parallel to the first guiding rod, said second guiding rod having two eccentric portions each being supported in the frame by means of a bearing, so that the guiding portion of the second guiding rod can be displaced perpendicularly to its longitudinal axis by rotating the second guiding rod in order to rotate the pickup unit along the first guiding rod wherein both the first and second guiding rods being engaged with the optical pickup unit for guiding the displacement of the pickup unit, whereby the second guiding rod is provided with a protrusion for keeping the optical pickup unit in a locking position when the second guiding rod is in a predetermined rotational position, and wherein the second guiding rod is rotationally drivable by an electric drive motor in order to move the protrusion for either releasing or blocking the optical pickup unit, whereby the electric drive motor rotates the second guiding rod after the device has been started up in order to release the optical pickup unit, and whereby the electric drive motor rotates the second guiding rod into said predetermined rotational position after the optical pickup unit has moved and returned to said locking position.

* * * * *